United States Patent [19]
Stillhard

[11] 3,735,805
[45] May 29, 1973

[54] METHOD AND APPARATUS FOR THE TEMPERATURE CONTROL OF MOLDING MACHINES

[75] Inventor: Bruno J. Stillhard, St. Gallen, Switzerland

[73] Assignee: Gebruder Buller AG, Uzivil, St. Gell, Switzerland

[22] Filed: Jan. 18, 1971

[21] Appl. No.: 107,475

Related U.S. Application Data

[63] Continuation of Ser. No. 759,334, Sept. 12, 1968, abandoned.

[30] Foreign Application Priority Data

Sept. 15, 1967 Switzerland .................... 12979/67

[52] U.S. Cl. ......................................... 165/12, 165/26
[51] Int. Cl. .......................................... F25b 29/00
[58] Field of Search .................. 165/13, 26, 27, 39, 165/40, 12

[56] References Cited

UNITED STATES PATENTS

| | | | |
|---|---|---|---|
| 1,671,666 | 5/1928 | Bausman | 165/26 |
| 3,292,687 | 12/1966 | Evans | 165/26 |
| 3,295,593 | 1/1967 | Nentzel | 165/26 |
| 174,810 | 3/1876 | Hannum | 165/64 |
| 1,671,666 | 5/1928 | Bausman | 165/26 X |
| 3,292,687 | 12/1966 | Evans | 165/26 |
| 3,295,593 | 1/1967 | Nentzel | 165/26 |

FOREIGN PATENTS OR APPLICATIONS

| | | | |
|---|---|---|---|
| 743,854 | 10/1966 | Canada | 18/30 HM |
| 1,066,806 | 4/1967 | Great Britain | 18/12 ST |

*Primary Examiner*—Charles Sukalo
*Attorney*—McGlew & Tuttle

[57] ABSTRACT

A compression or injection molding machine is connected to a source of hot temperature controlling fluid and to a source of a cooler temperature controlling fluid. Each component of the apparatus is provided with a common passage for flow of both fluids therethrough. Pulses are provided as a function of variation of the temperature of a component with respect to a selected temperature, and these pulses are used to selectively supply or interrupt flow of one or the other of the fluids through the associated common flow passage in accordance with the direction of the temperature variation.

7 Claims, 5 Drawing Figures

INVENTOR
BRUNO STILLHARD

BY
McGlew & Toren
ATTORNEYS

METHOD AND APPARATUS FOR THE TEMPERATURE CONTROL OF MOLDING MACHINES

This application is a continuation of Ser. No. 759,334 filed Sept. 12, 1968 and now abandoned.

BACKGROUND OF THE INVENTION

In the processing of plastics in compression and injection molding machines, constant temperature conditions in the areas of the processing tools or components which are in contact with the plastic are a prerequisite for scrapless production. In injection molding machines with a pressing worm for plasticizing the plastic, it is known to maintain the wall of the plasticization cylinder, the nozzle, and/or the injection molds as near as possible at a certain temperature, by means of heat transport media. For this purpose, a two-point temperature regulating system is known in which, for example, an appropriate channel or passage is provided in the wall of the tool or component through which a hot heat carrier, at a certain temperature, is pumped and conducted when the temperature of the component decreases below a nominal or pre-set value.

It is also known to provide a uniform flow of a heat carrier at constant temperature through a channel in the wall of the tool or component. These two known methods and the apparatus for performing the same have the disadvantage of being relatively inaccurate or of resulting in severe temperature fluctuations either in the tool, or component, or in the material to be processed.

To attain a more accurate temperature control, three-point temperature regulators have been proposed. In these arrangements, a vaporous, hot heat carrier and a liquid, cooler heat carrier, have been supplied to the tools or components alternately and through respective individual channels in the tools or components. The thermo-electric current of a thermocouple, disposed in the wall of the tool or component, is amplified in a three-point regulator or in a regulator of quasi-constant behavior. Thereby, the rate of temperature change is superposed on the amplifier input in a D-circuit. As a result, the control valves for the supply or interruption of the heat transport carriers will respond to the slightest temperature fluctuations in the tool or component. However, these known arrangements operating with a three-point temperature control, have the disadvantage of being complex in design and thus expensive.

SUMMARY OF THE INVENTION

This invention relates to the molding of plastics or hot melts and, more particularly, to a novel and improved method and apparatus for controlling the temperature of components of the molding machine. More particularly, the invention is directed to a temperature controlling method and apparatus using a hot heat carrier and a cooler heat carrier and in which a flow passage is common to both the source of the hot heat carrier and the source of the cooler heat carrier, there being at least one temperature sensor operatively associated with each of the components of the molding machine.

The primary objective of the present invention is to provide a temperature control method and apparatus for the tools or components of injection molding machines, and which assure a virtually constant temperature in the tools or components in a very simple design. In accordance with the invention, one or the other of the two heat carriers is selectively conducted through or discontinued in the common heat transport line or passage in the tool or component, using pulses which are a function of the temperature.

In further accordance with the invention, the apparatus provides that each tool or component has at least one zone with a heat transport line or passage, and that respective valves are interposed between the source of hot heat carrier and the source of cooler heat carrier and the transport line. Controlling means, instantly responding to any predetermined temperature change at a temperature sensor are provided to control the valves for the selective supply or interruption of flow of one or the other of the two heat carriers through the common transport passage or line.

An object of the invention is to provide an improved method of and apparatus for controlling the temperature of components of compression and injection molding machines.

Another object of the invention is to provide such a method and apparatus in which two heat carriers, one a hot heat carrier and the other a cooler heat carrier, are caused selectively to flow through a common flow passage in a component of the molding machine in accordance with fluctuations in temperature of the component.

A further object of the invention is to provide such a method and apparatus in which a heat sensor, operatively associated with a component or tool of a molding machine, initiates pulses to selectively initiate or interrupt the flow of one or the other of the two heat carriers through the common heat carrier passage and in accordance with variations of the temperature of the component from a preselected value.

Still another object of the invention is to provide such a method and apparatus which assures a virtually constant temperature in the tool or component in a simple and inexpensive manner.

A further object of the invention is to provide such a method and apparatus in which a controlling means is instantly responsive to any predetermined temperature change of a temperature sensor and controls valves for the selective connection or disconnection of either of the two heat transport mediums from the common heat transport line in the tool or component.

For an understanding of the principles of the invention, reference is made to the following description of a typical embodiment thereof as illustrated in the accompanying drawings.

DESCRIPTION OF THE PREFERRED EMBODIMENT

Figure 1:
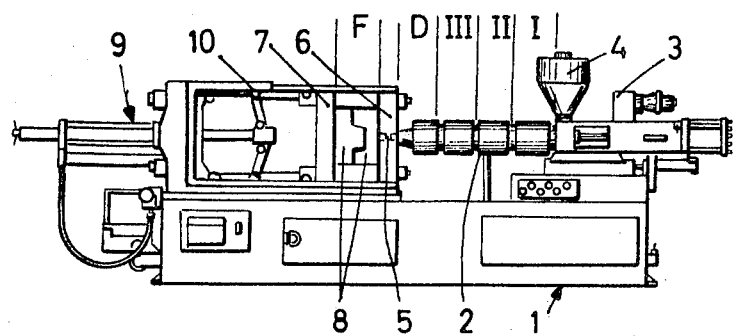
FIG. 1 is a side elevation view of a worm-type injection molding machine.

Referring to the drawings, FIG. 1 illustrates a worm-type injection molding machine including a frame 1 on which is mounted a plasticization cylinder 2 in which the plasticizing worm is rotatably mounted, the worm being driven by a motorized drive system illustrated at 3. A tank or hopper 4 is provided above cylinder 2 for feeding plastic granulate to the cylinder.

The material in cylinder 2 is discharged through an injection nozzle 5 which is fixed to the cylinder. The molding machine includes a fixed mold carrier 6 and a movable mold carrier 7, and a respective mold half 8 is secured to each of the carriers 6 and 7. A hydraulic system 9 and a toggle lever closure mechanism 10 are provided for actuating the movable mold carrier 7.

Plasticization cylinder 2, nozzle 5 and mold 8 comprise the tools or components of the injection molding machine. These tools or components are preferably divided into several heating or cooling zones, for temperature regulation. As will be seen in FIG. 1, plasticization cylinder 2 has three zones I, II, and III, adjacent to which are the zone D associated with nozzle 5 and the zone F associated with mold 8.

Depending on requirements, a respective flow line may be provided in each or all of the zones I–III, D and F, this line being connectible to a hot heat carrier source or to a cooler heat carrier source. Either the hot heat carrier or temperature controlling fluid or the cooler heat carrier or temperature controlling fluid is pumped through the line in dependence on the temperature prevailing in the respective zone.

Figure 2:
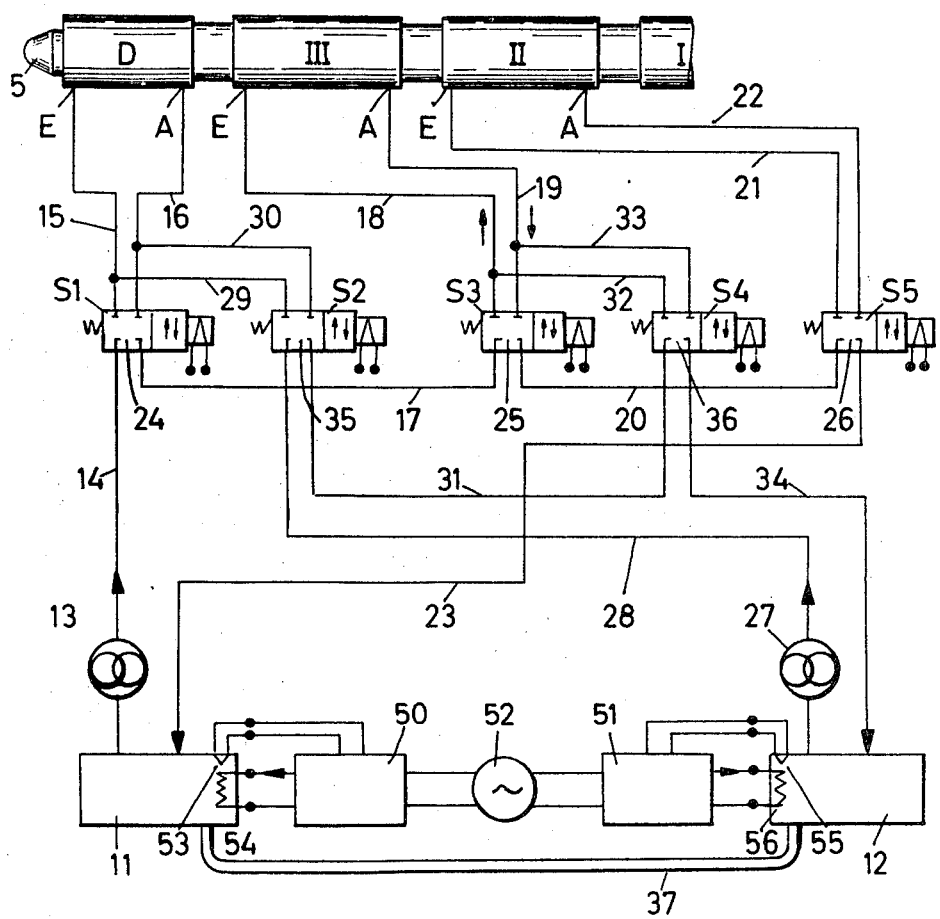
FIG. 2 is a flow diagram for both the hot heat carrier and the cooler heat carrier.

FIG. 2 schematically illustrates the heating or cooling zones II and III of plasticization cylinder 2, as well as the heating or cooling zone D of injection nozzle 5. The correlated heat transport and connecting lines to the hot heat carrier source 11 and the cooler heat source 12 are also illustrated. It will be noted that zone II of cylinder 2 is supplied with only the hot heat carrier by the two-point temperature control principle. However, the temperatures in zones III and D are controlled in accordance with the three-point temperature control principle.

The inlet ends E of the heat transport lines of zones D, III and II are connected to hot heat carrier source 11 through a line 14 in which is interposed a pressure insensitive flow creating means such as a volumetric pump 13, solenoid valve S1, a line 15, a line 16, a solenoid valve S1, a line 17, a solenoid valve S3, lines 18 and 19, solenoid valve S3, a line 20, a solenoid valve S5 and a line 21. The return flow from outlet ends A passes through a line 22, solenoid valve S5 and a line 23. Solenoid valves S1, S3 and S5 have bypasses 24, 25 and 26, respectively, which respectively connect line 14 with line 17, line 17 with line 20, and line 20 with line 23, directly and when lines 15, 18, and 21 are shut-off or blocked by the associated valves.

The source 12 of the cooler heat carrier is connected to the inlet ends E of zones D and III through a line 28, in which is interposed a pressure insensitive flow creating means such as a volumetric pump 27, a solenoid valve S2, a line 29, lines 15 and 16, a line 30, solenoid valve S2, a line 31, a solenoid valve S4, a line 32 and line 18. The return flow to the source 12 of the cooler heat carrier or temperature controlling fluid passes through line 19, a line 33, solenoid valve S4 and a line 34. When lines 29 and 32 are closed or blocked, lines 28 and 31 are interconnected by a bypass 35 and lines 31 and 34 are interconnected by a bypass 36.

If, for example, the plastic to be processed has the required nominal temperature in zones D and II, but has less than the required nominal temperature in zone III, solenoid valves S1, S2, S4 and S5 block the flow of the heat carriers, whereas the position of solenoid valve S3 provides for flow of the hot heat carrier through the passage in zone III. Thus, the hot heat carrier flows through line 14, bypass 24, line 17, solenoid valve S3, line 18, zone III, line 19, solenoid valve S3, line 20, bypass 26 and line 23 which returns the hot heat carrier to the hot heat carrier source 11.

On the other hand, if, for example, the plastic has the nominal temperature in zones II and III but has a temperature in excess of the nominal temperature in zone D, solenoid valves S1, S3, S4 and S5 block the flow of the heat carriers. In this case, the cooler heat carrier is pumped by pump 27 from source 12 through line 28, solenoid valve S2, line 29, and line 15 to the inlet of zone D. The cooler heat carrier returns to line 16, line 30, solenoid valve S2, line 31, bypass 36 and line 34 to source 12.

As can be seen in FIG. 2, the hot heat carrier source and the cooler heat carrier source, with the physical state of the heat carriers being the same, are interconnected through a level equalization line 37. The temperatures of the hot heat carrier and the cooler heat carrier are kept within close tolerance ranges, in the respective sources 11 and 12, by a temperature regulating system. For this purpose, a regulator 50, for the hot heat carrier source 11, and a regulator 51, for the cooler heat carrier source 12, are connected to a source of potential 52. Regulator 50 is controlled by a thermoswitch 53 in response to the temperature in source 11 and, in turn, switches on or off a heating coil 54. Analogously, regulator 51 is controlled by a thermoswitch 55 responsive to the temperature in source 12 and, in turn, switches on or off a cooling coil 56 positioned in source 55.

In order that the electromagnetic or solenoid valves S1 and S2, or S3 and S4, respond instantly, each of these two pairs of valves is correlated with a three-point regulator in a D-circuit.

Figure 3:
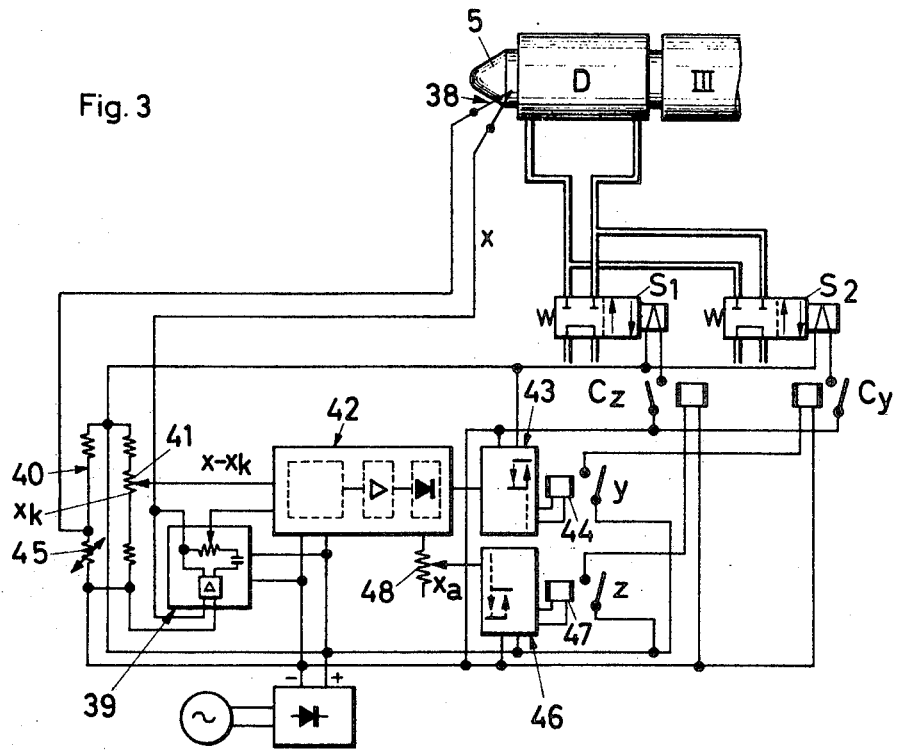
FIG. 3 is a schematic wiring diagram of a valve control when temperature sensing is effected thermoelectrically.

Referring to FIG. 3, the wiring diagram of the thermo-electric control of solenoid valves S1 and S2 of zone D is schematically illustrated. One leg of the thermo-element 38, comprising a thermocouple is connected directly with the D-component 39, and its other leg is connected with a bridge 40 having a D.C. potential applied thereto. The voltage differential $x-x_k$, between the thermovoltage $x$, which is proportional to the temperature, and the nominal value $x_k$, is tapped at a nominal value setting potentiometer 41 connected in bridge 40. This differential voltage $x-x_k$, increased by the voltage generated in the D-component and proportional to the modification rate of the normal magnitude $x$, is applied to the input of an amplifier 42 which is succeeded by a tripping phase 43 which instantly controls an output relay 44 so that the set magnitude $y$ energizes solenoid valve S2 through the magnetic switch $C_y$. Temperature compensation of the points of comparison is effected through a resistor 45 and bridge 40.

Solenoid valve S1 is controlled through a set magnitude $z$ by a second tripping phase 46 which operates an output relay 47, valve S1 being operated by a magnetic switch $C_2$. The switching point of the second tripping phase 46 is staggered relative to the switching point of the first tripping phase 43. Adjustment of such staggering $x_a$ is effected through the medium of a potentiometer 48.

Figure 4:
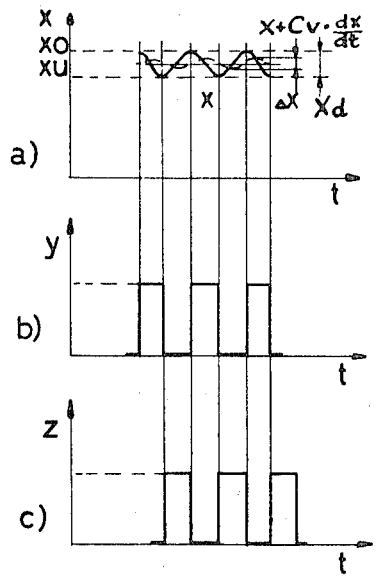
FIGS. 4 and 5 are graphic illustrations of the tool or component temperature and the setting values, as a function of time.

FIG. 4 illustrates the operating mode of the switching arrangement shown in FIG. 3 in achieving, by impulses, the supply or interruption of either the hot heat carrier or the cooler heat carrier. Referring to FIG. 4a, the temperature, in a static state, fluctuates in accordance with curve $x$, with the amplitude of fluctuation being designated $\Delta x$. Due to the fact that the modification rate of the normal value $Cv \cdot dx/dt$, generated in D-component 39, is added to the deviation $x$ from normal, there results, after appropriate amplification in amplifier 42, the curve $x + Cv \cdot dx/dt$ which has a considerably greater amplitude. In this curve, $Cv$ is a constant determined by the design of the D-member 39 and the amplifier 42 included therein. The thus attained greater amplitude of fluctuation $xd$ between $xo$ and $xu$ results in the set value characteristics shown in FIGS. 4b and 4c. Thus, FIG. 4b illustrates the characteristic of the set value $y$ for the cooler heat carrier, while FIG. 4c illustrates the characteristic of the set value $z$ for the hot heat carrier. The set value characteristics, as shown in FIGS. 4b and 4c, demonstrate that the output relays 44 and 47, and thus the respective valves S1 and S2, respond suddenly and instantly when the temperature either exceeds the nominal temperature value or falls below the latter.

A circuit analogous to that shown in FIG. 3 may be used for the two-point temperature regulation in zone II, with the associated valve S5. The tripping phase 46 is omitted, in this case, and the solenoid valve S5 is controlled by the set value of relay 44.

Figure 5:
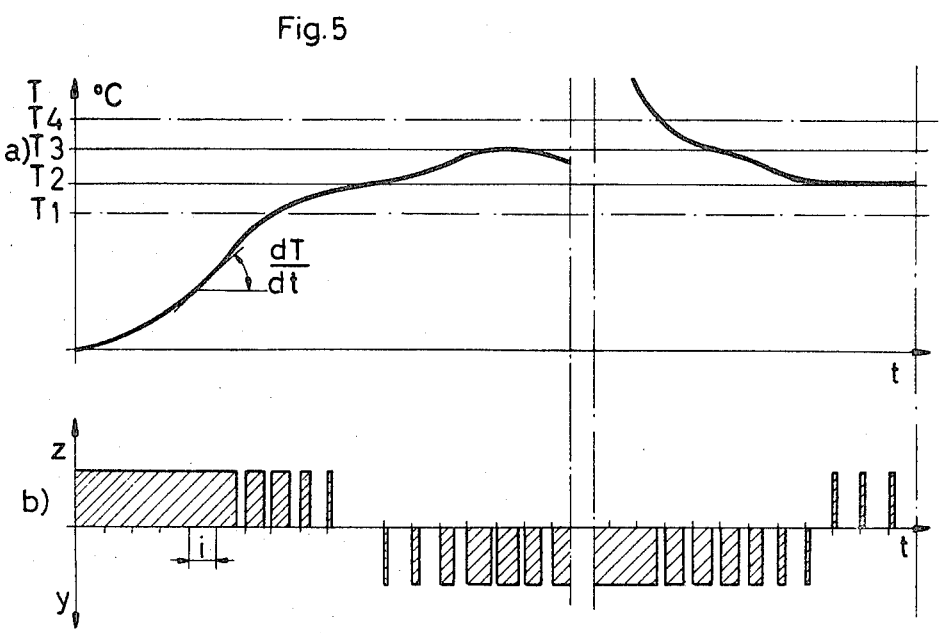

FIG. 5 illustrates the temperature curve of one of the tool zones to be temperature controlled, as well as the correlated heating or cooling pulses. In both figures, the value $z$ is plotted as the abscissa.

In FIG. 5a, the temperature T corresponding to the thermovoltage $x$ of FIG. 4, is plotted as the ordinate. Of the isothermal lines illustrated, T1 corresponds to the temperature of the cooler heat carrier, T2 to the nominal temperature, T3 to the upper temperature limit and T4 to the temperature of the hot heat carrier. The reference magnitude $dT/dt$ for the so-called D-superposition is determined as $dx/dt$ in the D-component 39 and applied to the input of amplifier 42.

Analogously to FIGS. 4b and 4c, the set values are plotted on the ordinate in FIG. 5b. The $z$ pulses are heating pulses and the $y$ pulses are cooling pulses. The time axis is divided into pulse intervals $i$ of constant pulse duration, which is determined by the design of the regulator, so that the switching pulses $z$ or $y$ always occur at the beginning of a pulse interval.

In a modification of the invention, which has not been shown, the mold 8, having the zone F, and in a manner analogous to the zones D and III of the illustrated modification, is provided with apparatus according to the invention for three-point temperature regulation for the processing of duroplast plastics. If required, zones I and II of the plasticization cylinder 2 may also be provided with similar apparatus.

Another modification, which also has not been shown, is directed to a compression molding machine wherein mold 8, and its respective zone F, is provided with apparatus according to the invention for three-point temperature regulation in a manner analogous to the arrangements for zones D and III of the illustrated modification.

The hot heat carrier and the cooler heat carrier are preferably in the same physical state. The application of a hot heat carrier and a cooler heat carrier of different physical states is also possible within the scope of the invention. The temperature of the hot heat carrier is preferably selected to be not more than 20 percent above the upper temperature limit, and it is advantageous to choose a temperature for the cooler heat carrier which is not more than 20 percent below the lowest nominal temperature. Solenoid valves S1 – S5 may be shielded from each other by means of heat insulation.

What is claimed is:

1. In apparatus for regulating the temperature of a component of compression and injection molding machines for processing heated deformable materials, such as hot flowing melts, by circulating a hot temperature controlling fluid and a cooler temperature controlling fluid, from respective sources of the fluids, through passage means in the component: the improvement comprising, in combination, at least one temperature sensor operatively associated with said component; said component including at least one zone having a single passage therein and constituting said passage means; a respective pair of independently operable, normally closed valves commonly connected to each said passage means; a pair of volumetric pumps, one having an inlet connected to one source and an outlet connected to one valve of each pair and the other having an inlet connected to the other source and an outlet connected to the other valve of each pair; respective return lines connecting each valve to its associated source; each pump constantly delivering fluid from its associated source to its associated valves; and controlling means, including pulse producing means in controlling relation with said valves, operatively associated with said temperature sensor and responsive instantaneously to every predetermined temperature variation as sensed by said temperature sensor; said controlling means, responsive to a preselected decrease in the temperature of said component below a preset nominal value, instantly supplying opening pulses to the valve connected to the source of hot fluid to supply the hot fluid to said passage means, during a pulse sequence correlated with the rate of change of the temperature, over a time duration sufficient to restore the component temperature to said nominal value; said controlling means, responsive to a preselected increase in the temperature of said component above said nominal value, instantly supplying an opening pulse to the valve connected to the source of cooler fluid to supply the cooler fluid to said passage means, during a pulse sequence correlation with the rate of change of the temperature, over a time duration sufficient to restore the component temperature to said nominal value.

2. In apparatus for regulating the temperature of a component of compression and injection molding machines, the improvement claimed in claim 1, in which said temperature sensor is a thermocouple having an output thermovoltage; said valves being solenoid operated valves; said controlling means comprising a three-point regulator connected between said thermocouple and said valves and having a quasi-constant characteristic.

3. In apparatus for regulating the temperature of a component of compression and injection molding machines, the improvement claimed in claim 2, in which said component has an associated injection nozzle.

4. In apparatus for regulating the temperature of a component of compression and injection molding machines, the improvement claimed in claim 1, including a level equalizer interconnecting said two sources of temperature controlling fluid.

5. In apparatus for regulating the temperature of a component of compression and injection molding machines, the improvement claimed in claim 1, including heat insulating means heat isolating said valves from each other.

6. In apparatus for regulating the temperature of a component of compression and injection molding machines, the improvement claimed in claim 1, including temperature regulating means operatively associated with the source of hot temperature controlling fluid and operable to maintain the temperature of the hot temperature controlling fluid substantially constant at a value not in excess of 20% more than said nominal value.

7. In apparatus for regulating the temperature of a component of compression and injection molding machines, the improvement claimed in claim 1, including temperature regulating means operatively associated with said source of cooler temperature controlling fluid and operable to maintain the temperature of the cooler temperature controlling fluid substantially constant at a value not in excess of 20 percent less than said nominal value.

* * * * *

UNITED STATES PATENT OFFICE
CERTIFICATE OF CORRECTION

Patent No. 3,735,805　　　　　　　　　Dated May 29, 1973

Inventor(s) Bruno J. Stillhard

It is certified that error appears in the above-identified patent and that said Letters Patent are hereby corrected as shown below:

On the cover sheet [73] "Uzivil, St. Gell, Switzerland" should read -- Uzwil, St.Gallen, Switzerland --.

Signed and sealed this 19th day of February 1974.

(SEAL)
Attest:

EDWARD M. FLETCHER, JR.　　　　　C. MARSHALL DANN
Attesting Officer　　　　　　　　　Commissioner of Patents

UNITED STATES PATENT OFFICE
CERTIFICATE OF CORRECTION

Patent No. 3,735,805　　　　　　　　　Dated May 29, 1973

Inventor(s)　　Bruno J. Stillhard

It is certified that error appears in the above-identified patent and that said Letters Patent are hereby corrected as shown below:

On the cover sheet the assignee should read

-- Gebruder Buhler AG, Uzwil, St. Gallen, Switzerland --.

This certificate supersedes Certificate of Correction Issued February 19, 1974.

Signed and sealed this 5th day of November 1974.

(SEAL)
Attest:

McCOY M. GIBSON JR.　　　　　　　　　C. MARSHALL DANN
Attesting Officer　　　　　　　　　　Commissioner of Patents